United States Patent [19]

Biby

[11] Patent Number: 4,841,742
[45] Date of Patent: Jun. 27, 1989

[54] PORTABLE AIR CONDITIONER FOR AUTOMOTIVE VEHICLES

[76] Inventor: Robert Biby, 421 Arrowhead Ct., Troy, Ill. 62294

[21] Appl. No.: 146,819

[22] Filed: Jan. 22, 1988

Related U.S. Application Data

[63] Continuation-in-part of Ser. No. 946,861, Dec. 29, 1986, abandoned.

[51] Int. Cl.⁴ .............................................. F25D 3/08
[52] U.S. Cl. ...................................... 62/420; 165/122
[58] Field of Search .................... 62/420, 421, 422; 98/40.18; 126/61, 68, 72; 165/122

[56] References Cited

U.S. PATENT DOCUMENTS

| | | | |
|---|---|---|---|
| 1,171,387 | 2/1916 | Dickson | 62/420 X |
| 1,923,547 | 8/1933 | Madden | 62/420 X |
| 2,113,359 | 4/1938 | Stebbins | 62/420 X |
| 2,262,405 | 11/1941 | Peterson | 62/421 |
| 2,557,004 | 6/1951 | Lepper | 62/239 X |
| 3,043,116 | 7/1962 | Fuller | 62/420 X |
| 4,177,652 | 12/1979 | Volk | 62/239 |

FOREIGN PATENT DOCUMENTS

| | | | |
|---|---|---|---|
| 638776 | 8/1927 | France | 62/420 |
| 23580 | 11/1908 | United Kingdom | 62/420 |

*Primary Examiner*—William E. Tapolcai
*Attorney, Agent, or Firm*—Glenn K. Robbins

[57] ABSTRACT

A portable air conditioning unit for cars, campers, vans, tents and other enclosures. The unit is substantially noiseless and free from vibration. It comprises an insulated housing, internal cooling heat exchanger, a blower fan, and inlet and outlet ports. The coolant used is natural ice to which anti-freeze or salt may be added to increase cooling capacity. The air conditioner can cool for as long as 4 days on one change of coolant and has a very low drain on the battery supply, which may be conserved by electronic power control.

13 Claims, 4 Drawing Sheets

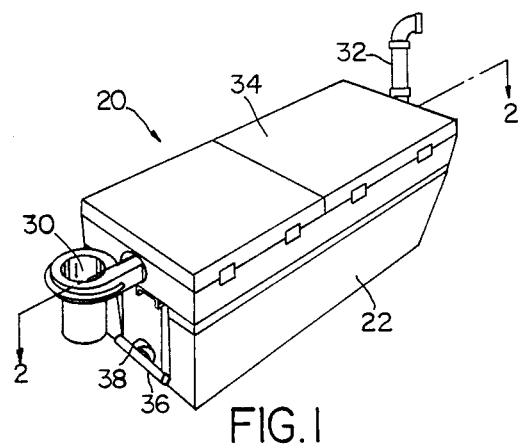
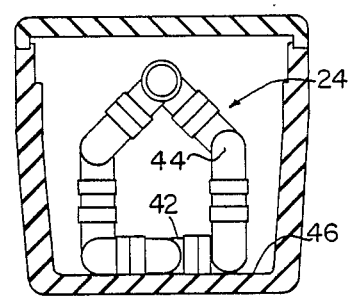
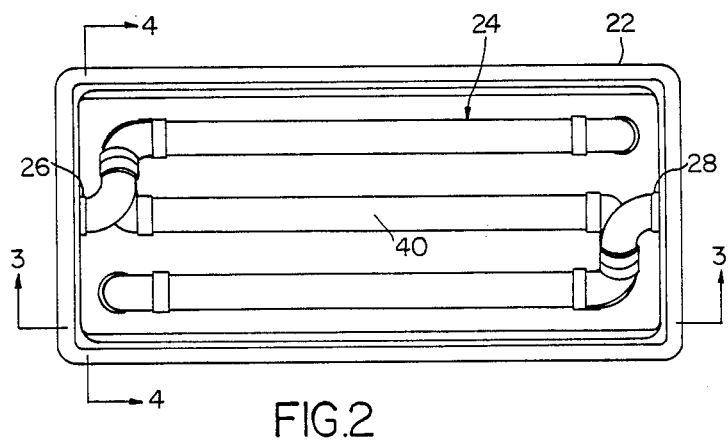
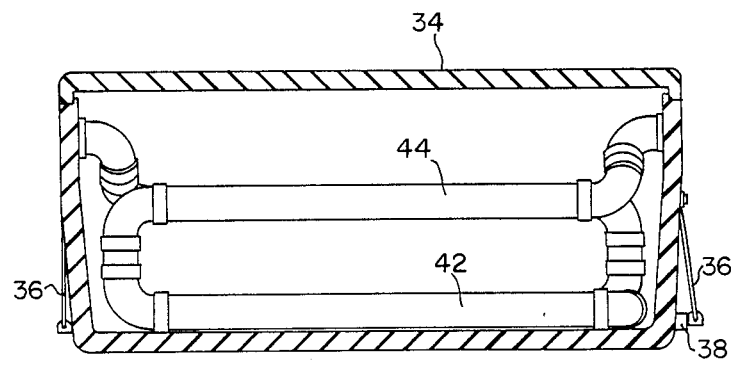

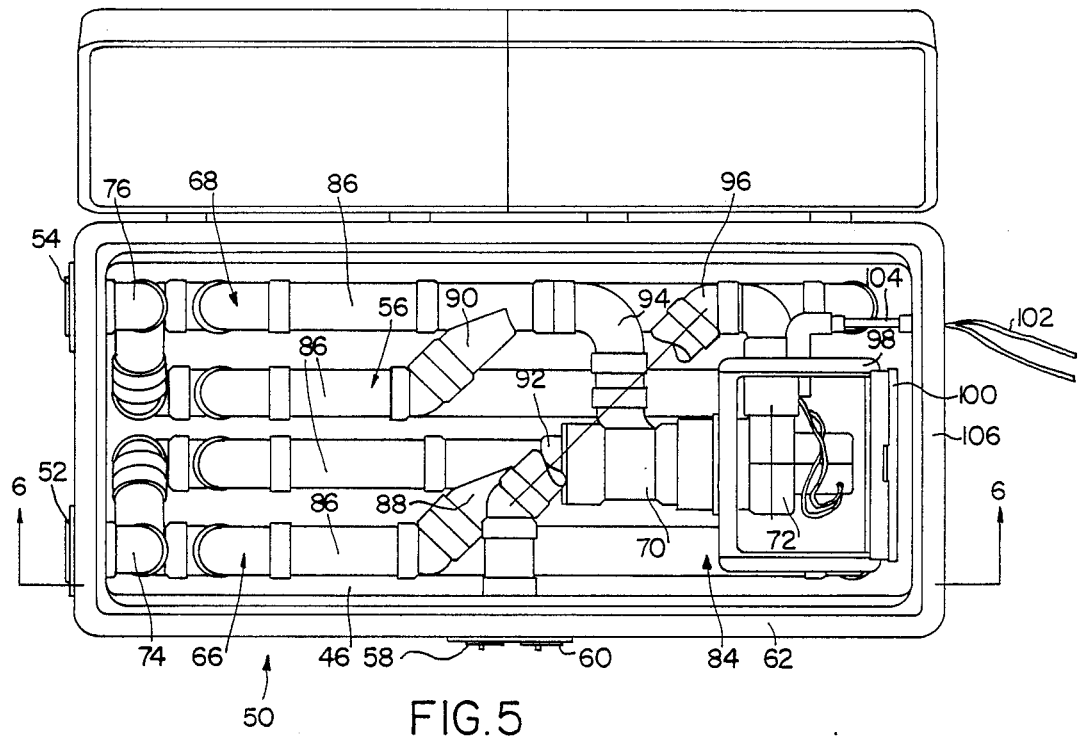
FIG.5
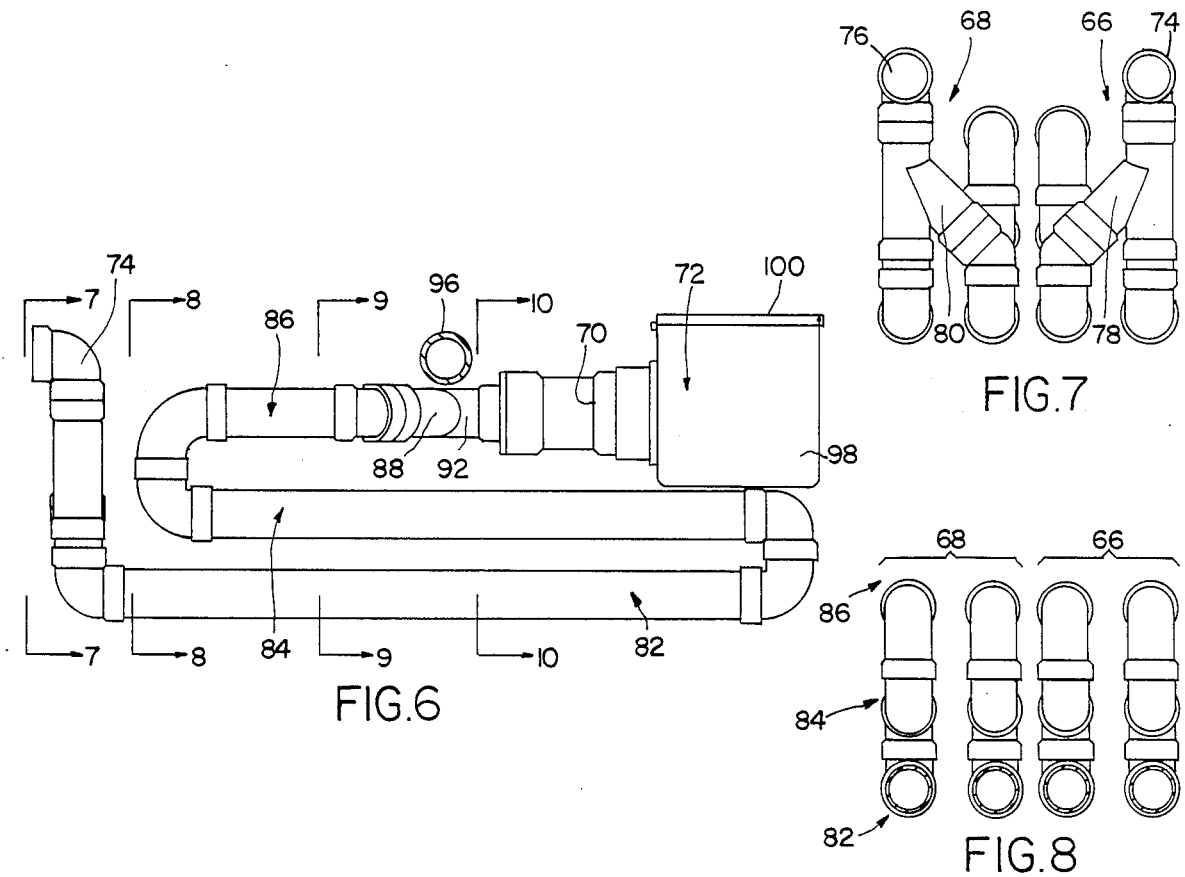
FIG.6
FIG.7
FIG.8

PORTABLE AIR CONDITIONER FOR AUTOMOTIVE VEHICLES

RELATED APPLICATION

This application is a continuation in part of my copending application Ser. No. 946,861, filed Dec. 29, 1986, now abandoned.

BACKGROUND OF THE INVENTION

The portable air conditioner was designed for use primarily in law enforcement surveillance units. However, it is useful as well in every day vans, campers, boats, automobiles and could even be used in tents or similar enclosures.

Surveillance units are normally converted vans equipped with sophisticated electronic eavesdropping devices. Since most surveillances are covert in nature, a vehicle sitting in a parking lot should look as normal as possible. Although most surveillance vans have factory installed air conditioners, these devices are operable only when the van engine is running. Exhaust and noise from the engine detract from, and could give away, the covert operation with disastrous consequences. The time spent in setting up equipment, testing and plain waiting for suspects to arrive, or for the occurence to conclude, may encompass hours.

The temperature of an enclosed van on a hot summer day in bright sun can reach 160 to 180 degrees F., which is not only uncomfortable and dangerous to the surveillance personnel, but could damage the high technology equipment or cause it to malfunction.

Custom made and expensive surveillance vans have in the past employed battery powered air conditioners, but these air conditioners utilize dry ice, not natural ice. Dry ice ($CO_2$) is often difficult to obtain, and expensive, and because of the chemical additives used, often contain toxic vapors. There has continued to be a problem in obtaining a portable battery powered air conditioner using easily obtained ice that is simple to operate and maintain at a low cost.

SUMMARY OF THE INVENTION

By means of this invention there has been provided a portable air conditioning unit that is substantially noiseless and may be employed in any small enclosure to be cooled. The unit employs a conventionally sized insulated housing and by the use of handles may be easily transported from one location to another.

Essentially the unit employs a self-contained internal heat exchanger through which outside air to be cooled is forced by a battery powered blower connected to a convenient source of electrical energy such as a car battery. The coolant in its simplest form of natural chipped, crushed or cubed ice is charged to the housing through a top lid to fill the housing and cover the heat exchanger. When the ice has melted a drain plug is opened to drain the contents.

One advantage of the instant unit is its use of natural ice instead of dry ice. Another advantage is its high cooling capacity efficiency. Once filled with ice, the unit can last for 2 to 4 days and cause only a minimum drain on a battery supply which can be extended by an electronic power control. The unit is capable of cooling a van, with outside temperature of 100 degrees F., to the low 70's for an extended period of time.

Although the unit is designed especially for surveillance units, it can readily be seen that its use could be in civilian cars, vans, boats, the tents or other small enclosures where a high efficiency unit using natural ice and a battery as a source of power can be conveniently employed.

In practice, the case is first filled with natural ice so that the cooling pipe is surrounded by coolant. As warm air is sucked into the interior of the case and through the cooling pipe the warm air is cooled. When it is forced through the outlet port and out the outlet, the desired cooling effect is achieved. A greater cooling effect may be obtained by adding anti-freeze or salt to the coolant mixture. The addition of anti-freeeze is found to be desirable only under extreme heat conditions not normally encountered.

The only external source necessary for operation is a battery or other electrical source. The blower fan may be equipped with a plug having a cigarette lighter plug for connection to an automobile or van cigarette lighter receptacle or may be attached directly to a separate battery. The invention thus described provides a portable, high-efficiency air conditioner for use in surveillance vans or any enclosures small enough to be cooled by the unit. The typical van consists of approximately 300 square feet and the air conditioner can cool a van to a comfortable temperature.

The portable air conditioner of this invention may be simply employed in a van or otherwise as desired. The only set-up required is charging with ice and connection to a battery. Through provision of handles, it may be easily transported and, through a drain, can be easily drained of melt water. The air conditioner is rugged and through its convenience in use and low cost and simple set-up lends itself to ready employment with a minimum of set-up time.

The above features are objects of this invention. Further objects will appear in the detailed description which follows and will be further apparent to those skilled in the art.

For the purpose of illustration of this invention preferred embodiments thereof are shown in the accompanying drawing. It is to be understood that the drawing is for purpose of description only and that the invention is not limited thereto.

IN THE DRAWING

FIG. 1 is a pictorial view of the portable air conditioner;

FIG. 2 is a top plan view of the air conditioner with the top removed;

FIG. 3 is a view in section taken on line 3—3 of FIG. 2;

FIG. 4 is a view in section on line 4—4 of FIG. 2;

FIG. 5 is a top plan view of a modified air conditioner with the lid open;

FIG. 6 is a view in front elevation of the heat exchanger unit of the modified air conditioner;

FIG. 7 is a view in section taken on line 7—7 of FIG. 6;

FIG. 8 is a view in section taken on line 8—8 of FIG. 6;

DESCRIPTION OF THE INVENTION

Figure 9:
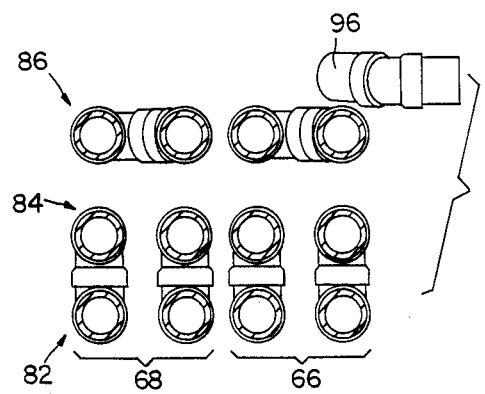
FIG. 9 is a view in section taken on line 9—9 of FIG. 6.
Figure 10:
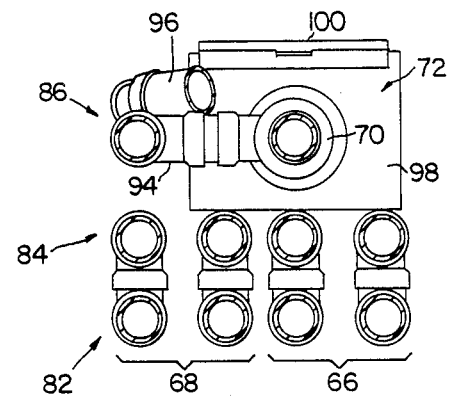
FIG. 10 is a view in section taken on line 10—10 of FIG. 6.
Figure 11:
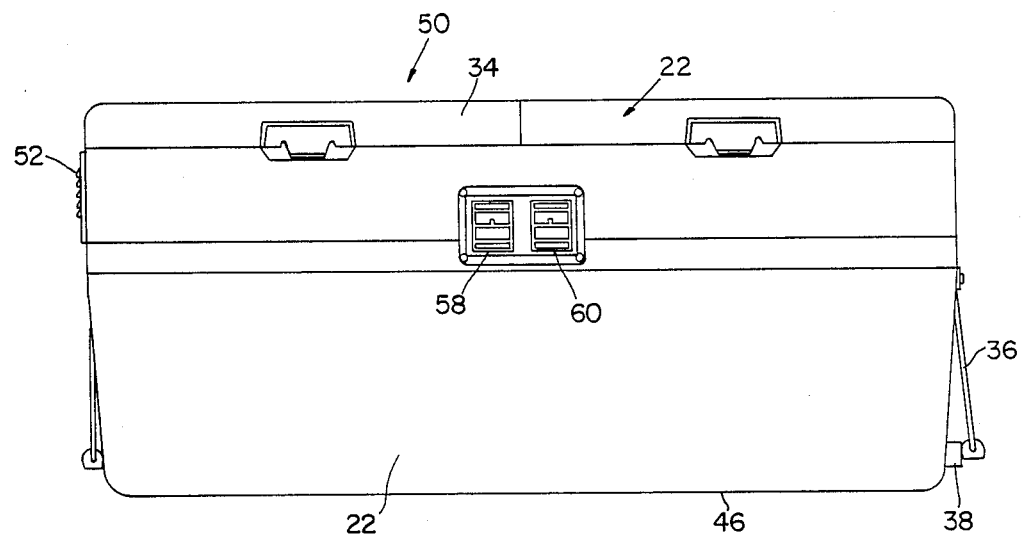
FIG. 11 is a view in front elevation of the modified air conditioner of FIG. 5.
Figure 12:
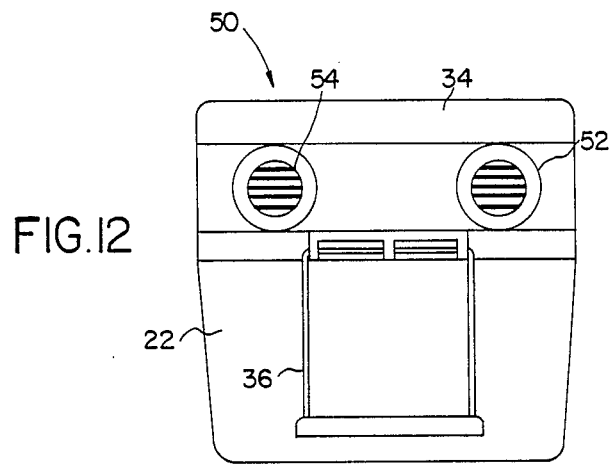
FIG. 12 is a view in side elevation of the modified air contioner taken from the left side.

The portable air conditioner of this invention is generally designated by the reference numeral 20 in FIGS. 1-4. It is comprised of an insulated housing 22 in which is contained a unitary heat exchanger 24 communicating with outside air through an inlet port 26 and an outlet port 28. A blower 30 is connected to the inlet port for forcing air through the heat exchanger and the outlet port 28 to a cool air exhaust directing tube 32.

The housing 22 may be in the form of a conventitonal insulated ice chest such as that manufactured by Gott Corporation in Winfield, Kan. and as an example, a 172 quart ice chest. The housing has a hinged lid 34 which when open permits the charging of the housing with ice. The housing is further provided with a pair of handles 36 at the opposite end and a drain plug or the like 38 at the bottom for draining water as the ice melts.

The blower 30 is provided with a conventional squirrel cage fan and is connected to the housing at the inlet port 26 to force room air to be cooled through the heat exchanger 24. From the heat exchanger the cooled air is forced through the outlet port 28 to the cool air exhaust directing tube 32. The exhaust tube is in the form of a chimney having an elbow outlet which may be rotated to direct the cool exhaust air as desired.

The heat exchanger 24 may be constructed of conventional plastic pipe with appropriate elbows for the necesary turns. Polyvinyl chloride pipe or tubing, as an example, may be employed for ease in fabrication or low cost. It will also be understood that for greater cooling efficiency metal piping or tubing of steel, iron, aluminum or copper may be employed. External and internal fins on the pipes may also be utilized for maximum heat exchange efficiency.

The heat exchanger 24 employs a number of switches comprising a plurality of U-shaped passes 40 to effect a circuitous or tortuous path for the air to be cooled by the ice coolant as shown in FIG. 2. These are arranged in a series of vertically disposed horizontal tiers 42 and 44 as shown in FIG. 3. This arrangement provides a self-supported unitary heat exchanger which may stand as a unit. Installation of the heat exchanger or removal of the heat exchanger unit is readily effected.

The heat exchanger 24 when installed in the housing may rest on the floor 46 of the housing. It is secured by a strap or the like (not shown) around one of the lower passes to prevent floating ad upward pressure of the heat exchanger when the ice melts as will be well understood. When installed, the heat exchanger as well shown in FIG. 4 substantially fills the housing but is slightly spaced from the ends and side walls to permit chipped ice, ice cubes or the like to cover and enclose all the exterior surfaces of the tube passes.

For energization of the blower 30 it will be understood that conventional electrical leads may be employed (not shown).These leads may be equipped using a standard plug for connection to a cigarette lighter in the vehicle. Alternatively a separate battery may be employed and alligator clamps or the like may be used for attachment to the battery. It will also be understood that instead of DC the blower may be AC and the leads may be connected to an AC outlet where available. Such latter use may be desirable in a number of instances such as surveillance in a building equipped with electricity where silence is desired.

A modified air conditioner 50 is shown on FIGS. 5-14. A housing is employed which is indicated by the reference numeral 22 and is identical to that utilized in the embodiment 20 of FIGS. 1-4. The same reference numerals are employed for common features of the housing.

In the air conditioner 50 a unitary self-supporting heat exchanger is employed with U-shaped passes and vertical tiers. The construction is modified to provide for internal positioning of the blower and exhaust vents. As best shown in FIGS. 5, 6, 11 and 12, the housing 22 has a pair of inlet ports 52 and 54 communicating the modified heat exchanger 56 with room air. A pair of standard adjustable louver outlets 58 and 60 are positioned in a front wall 62 of the housing to communicate the exhaust end of the air conditioner with the room. The air cooled may thereby be directed as desired.

The heat exchanger 56 in the modified air conditioner 50 is, as in the case for the heat exchanger 24 in the prior embodiment 20 of FIGS. 1-5, unitary and self-supporting. The modified heat exchanger 56 has been designed to provide greater heat exchange efficiency as well as completely internal support of the blower and exhaust directing louver. This not only makes the unit more compact and self-contained but by the internal support of the blower reduces the small amount of noise associated with it.

The heat exchanger 56 as best shown in FIGS. 5-10 is constructed in two sections 66 and 68 which are connected to a manifold 70 leading to the inlet of a blower 72. The inlet ports 52 and 54 of the housing are connected to elbows 74 and 76, respectively, which form the inlet passes of the two sections 66 and 68 of the two heat exchanger sections.

Each of the sections 66 and 68 have a wye connection 78 and 80, respectively, which further split up the heat exchanger as best shown in FIG. 7. The various tube passes are arranged by this construction to provide a series of horizontally disposed separate tier sections 82, 84 and 86 as best shown in FIGS. 7-10. The section 82 lays on the floor 46 of the air conditioner housing, while the section 84 is disposed above it, and the section 86 is a top most section. The tier sections 82 and 84 extend substantially laterally and longitudinally within the housing while the top tier is substantially foreshortened and spaced from the right end of the housing as shown in FIG. 5 to provide a recessed nest or space for the internally supported blower. The blower, as will be more fully described below, rests upon the intermediate tier or row 84.

The two sections 66 and 68 are further provided with wye sections 88 and 90 as best shown in FIGS. 5 and 6 where their tube passes are joined. The two wyes 88 and 90 are connected to tubes 92 and 94, respectively, which lead to the aforementioned manifold 70 at the blower inlet. An outlet tube 96 from the blower outlet passes forced air to the outlet louvers 58 and 60.

The blower 72 as best shown in FIGS. 5 and 6 is supported within a protective box 98 which fits within the recessed space provided by the foreshortening of the top tier 86 and is supported. The box rests upon the intermediate tier 84. A hinged lid 100 provides protection and access to the blower. Electrical leads 102 are passed through a rigid protective conduit 104 secured between the blower box and the end wall 106 of the housing to the exterior of the air conditioner.

Figure 13:
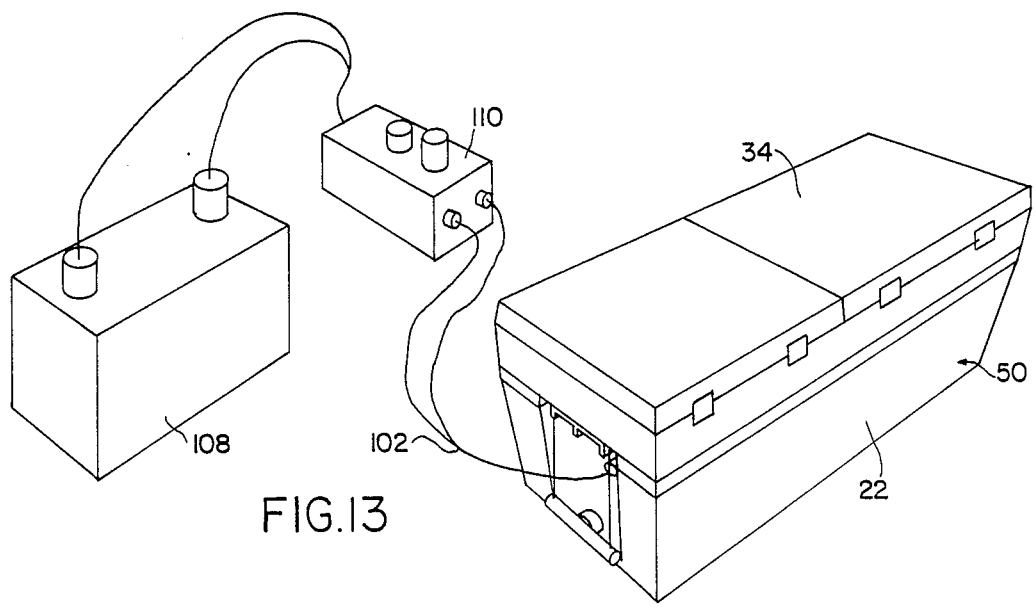
FIG. 13 is a pictorial view of the rear and right end of the air conditioner showing connection to a battery and current conserver.

The air conditioner of this invention is shown connected to a storage battery 108 and an electronic power control 110 in FIG. 13. The electronic power control is used for energy conservation of the battery over extended periods of use. It will be understood that the air conditioner blower may be connected directly to the battery or a cigarette lighter as previously described or may be modified for connection to an AC outlet.

The electronic power control may for an example be that manufactured by Minn Kota of Mankato, Minn. under the name Maximizer. While marketed primarily for electric battery energized trolling motors it may be efficiently employed to service the DC blower motor of the blower in the air conditioner. The operation is conventional in that the blower motor is turned to full speed and the standard Maximizer controls are employed to vary the speed of the blower to maximum where needed to a lesser speed to maintain the room temperature after cooling.

Figure 14:
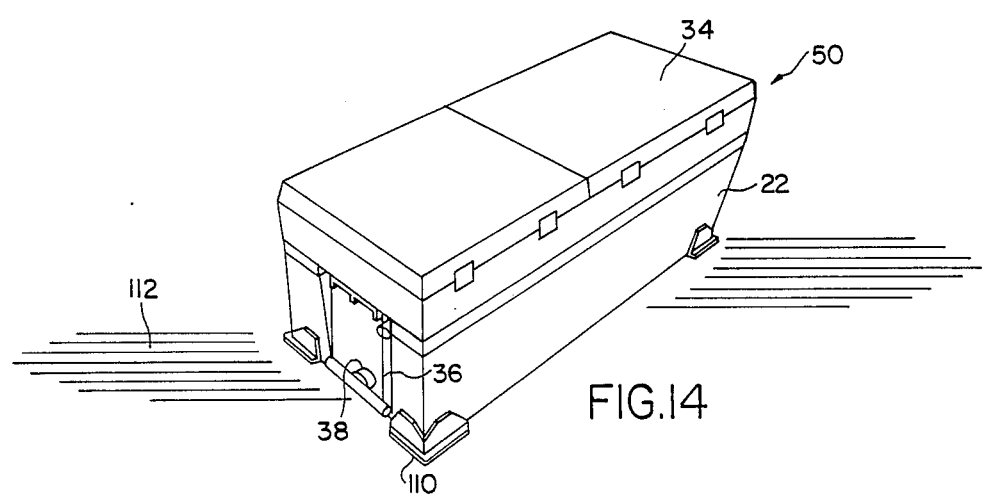
FIG. 14 is a view similar to FIG. 13 showing the air conditioner positioned within corner stops on the floor support.

There is shown in FIG. 14 a series of stops or brackets 110 used to stop sliding or shifting of the air conditioner. When the air conditioner is simply placed on the floor, sudden starts, stops or turns may be occasioned. At rapid speeds such as in pursuit or the like, such shifting is possible. The stop brackets are L-shaped and may be secured to the floor 112 of the vehicle by any conventional means such as screws or the like. The engagement of the brackets with the corners of the housing of the air conditioner protects against such tendencies to shift or slide. The housing can be simply dropped into nested engagement with the brackets and lifted out when desired. If a full lock-in-place securement is desired, sealing or other connection of the housing to the corner brackets may be utilized as will be well understood.

Various changes and modifications may be made within this invention as will be apparent to those skilled in the art. Such changes and modifications are within the scope and teaching of this invention as defined in the claims appended hereto.

What is claimed is:

1. A portable air conditioner, said air conditioner comprising a box-like, heat insulated housing, said housing having a top lid adapted to be opened and closed, heat exchange means comprising a series of tube passes having an air inlet connected through a wall of said housing in communication with air outside said housing and an air outlet connected through a wall of said housing remote from said air inlet in communication with air outside said housing, blower means connected to said heat exchange means for forcing outside air through said inlet, through said heat exchange means and through said outlet, said housing receiving an ice coolant substantially filling said housing, around said heat exchange means, drain means at a bottom portion of said housing for draining said coolant, and handles at opposed end of said housing for transporting said air conditioner, said heat exchange means and said series of tube passes comprising a self supporting, semi-rigid structure which can be installed and removed as a unit in said housing, said blower means being provided with electrical leads externally of the housing for connection to a source of electrical energy and the blower means being provided with a direct current motor and the source of electrical energy being a battery.

2. The air conditioner of claim 1 in which said tube passes are arranged in a series of U-shaped passes arranged in a level tier, and a multiplicity of vertically arranged tiers are employed to provide a circuitous heat exchange path for air inside said tube passes and the coolant on the exterior of said passes.

3. The air conditioner of claim 1 in which said housing has a flat bottom and is supported upon a floor of a vehicle and stop means are provided to prevent said housing from sliding during transit, said stop means comprising stop means secured upon said floor engageable with opposed sides and ends of said housing to prevent said sliding.

4. The air conditioner of claim 2 in which said tube passes are arranged in a plurality of sections, said sections each communicating with a plurality of separate air inlets in said housing, said separate sections further being connected to a common manifold leading to an inlet of said blower means.

5. A portable air conditioner, said air conditioner comprising a box-like, heat insulated housing, said housing having a top lid adapted to be opened and closed, heat exchange means comprising a series of tube passes having an air inlet connected through a wall of said housing in communication with air outside said housing and an air outlet connected through a wall of said housing remote from said air inlet in communication with air outside said housing, blower means connected to said heat exchange means for forcing outside air through said inlet, through said heat exchange means and through said outlet, said housing receiving an ice coolant substantially filling said housing, around said heat exchange means, drain means at a bottom portion of said housing for draining said coolant, and handles at opposed end of said housing for transporting said air conditioner, said blower means being connected in line with said tube passes and is supported inside said housing upon said tube passes.

6. The air conditioner of claim 5 in which said tube passes are arranged in a series of U-shaped passes arranged in a level tier, and a multiplicity of vertically arranged tiers are employed to provide a circuitous heat exchange path for air inside said tube passes and the coolant on the exterior of said passes, said vertically arranged tier comprising a plurality of adjacent bottom tiers extending longitudinally and laterally to adjacent interior walls of said housing and at least a top one of said tiers being spaced laterally and horizontally from the interior walls to provide a pocket recess receiving said blower means.

7. The air conditioner of claim 6 in which said blower means comprises a blower mounted in a protective box, said box having an inlet and outlet communicating with said tube passes.

8. The air conditioner of claim 7 in which electrical leads are provided to said blower extending through said box and a protective rigid conduit in a wall of said housing for connection to a source of electrical energy.

9. A portable air conditioner, said air conditioner comprising a box-like, heat insulated housing, said housing having a top lid adapted to be opened and closed, heat exchange means comprising a series of tube passes having an air inlet connected through a wall of said housing in communication with air outside said housing and an air outlet connected through a wall of said housing remote from said air inlet in communication with air outside said housing, blower means connected to said heat exchange means for forcing outside air through said inlet, through said heat exchange means and through said outlet, said housing receiving an ice coolant substantially filling said housing, around said heat exchange means, drain means at a bottom portion of said housing for draining said coolant, and handles at opposed end of said housing for transporting said air conditioner, said heat exchange means and said series of tube passes comprising a self supporting, semi-rigid structure which can be installed and removed as a unit in said housing, said tube passes being arranged in a series of U-shaped passes arranged in a level tier, and a multiplicity of vertically arranged tiers being employed to provide a circuitous heat exchange path for air inside said tube passes and the coolant on the exterior of said passes, and said vertically arranged tier comprising a plurality of adjacent bottom tiers extending longitudinally and laterally to adjacent interior walls of said housing and at least a top one of said tiers being spaced laterally and horizontally from the interior walls to provide a pocket recess receiving said blower means.

10. The air conditioner of claim 9 in which said vertically arranged tier comprise a plurality of adjacent bottom tiers extending longitudinally and laterally to adjacent interior walls of said housing and at least a top one of said tiers being spaced laterally and horizontally from the interior walls to provide a pocket recess receiving said blower means.

11. The air conditioner of claim 10 in which said blower means comprises a blower mounted in a protective box, said box having an inlet and outlet communicating with said tube passes, electrical leads are provided to said blower extending through said box and a protective rigid conduit in a wall of said housing for connection to a source of electrical energy, and said electrical leads are connected to an electronic power control for conserving electrical energy in below maximum speeds of the blower means and said electronic power control is connected to said battery.

12. A portable air conditioner, said air conditioner comprising a box-like, heat insulated housing, said housing having a top lid adapted to be opened and closed, heat exchange means comprising a series of tube passes having an air inlet connected through a wall of said housing in communication with air outside said housing and an air outlet connected through a wall of said housing remote from said air inlet in communication with air outside said housing, blower means connected to said heat exchange means for forcing outside air through said inlet, through said heat exchange means and through said outlet, said housing receiving an ice coolant substantially filling said housing, around said heat exchange means, drain means at a bottom portion of said housing for draining said coolant, and handles at opposed end of said housing for transporting said air conditioner, said blower means being provided with electrical leads externally of the housing for connection to a source of electrical energy, the blower means being provided with a direct current motor and the source of electrical energy being a battery, and said blower means being connected in line with said tube passes and being supported inside said housing upon said tube passes.

13. A portable air conditioner, said air conditioner comprising a box-like, heat insulated housing, said housing having a top lid adapted to be opened and closed, heat exchange means comprising a series of tube passes having an air inlet connected through a wall of said housing in communication with air outside said housing and an air outlet connected through a wall of said housing remote from said air inlet in communication with air outside said housing, blower means connected to said heat exchange means for forcing outside air through said inlet, through said heat exchange means and through said outlet, said housing receiving an ice coolant substantially filling said housing, around said heat exchange means, drain means at a bottom portion of said housing for draining said coolant, and handles at opposed end of said housing for transporting said air conditioner, said heat exchange means and said series of tube passes comprise a self supporting, semi-rigid structure which can be installed and removed as a unit in said housing, said tube passes are arranged in a series of U-shaped passes arranged in a level tier, and a multiplicity of vertically arranged tiers are employed to provide a circuitous heat exchange path for air inside said tube passes and the coolant on the exterior of said passes, said tube passes are arranged in a plurality of sections, said sections each communicating with a plurality of separate air inlets in said housing, said separate sections further being connected to a common manifold leading to an inlet of said blower means, each of said sections is further provided with a wye connection adjacent inlet portions of said section to provide sub-sections of said separate sections and further wye connections for said sub-connections to combine said sub-sections into the separate sections in advance of said common manifold.

* * * * *